Sept. 21, 1965 A. J. GRUODIS ETAL 3,207,922

THREE-LEVEL INVERTER AND LATCH CIRCUITS

Filed Oct. 2, 1961 2 Sheets-Sheet 1

INVENTORS
ALGIRDAS J. GRUODIS
WILLIAM H. MC ANNEY

BY Edward G. Fiorito

AGENT

Sept. 21, 1965 A. J. GRUODIS ETAL 3,207,922

THREE-LEVEL INVERTER AND LATCH CIRCUITS

Filed Oct. 2, 1961 2 Sheets-Sheet 2

United States Patent Office 3,207,922

Patented Sept. 21, 1965

3,207,922

THREE-LEVEL INVERTER AND LATCH CIRCUITS

Algirdas J. Gruodis, Hyde Park, and William H. McAnney, Poughkeepsie, N.Y., assignors to International Business Machines Corporation, New York, N.Y., a corporation of New York Filed Oct. 2, 1961, Ser. No. 142,158
10 Claims. (Cl. 307—88.5)

This invention relates to computer circuits and more particularly to inverter and latch circuits which operate upon signals capable of existing at one of three different levels.

The conventional two-level binary signals which is used in most digital computers has been found to be inadequate for asynchronous operation. No clock pulses are used in asynchronous operation; the operation in each unit of the computer is initiated by detecting that the operation in some prior unit has been completed. The two-level signals does not provide an indication that the operation in a unit is completed, because at the end of a unit's operation the outputs can exist at either of the two levels. For example, in the two-level system the outputs of any particular computer unit can be sensed to determine whether they have changed from a first level to the second level. However, if the results of the operation in this unit are such that some of the outputs remain in the first level, a change from the first level to the second level is not detected in all of the outputs and it cannot be determined whether the operation within the unit is completed. In the three-level system, the first level and the third level are assigned as the information levels and the second level is assigned as the non-information level. Therefore, the outputs of any unit of the computer can be sensed to determine whether each of them has shifted from the non-information to either one of the information levels. When all of the outputs from any computer unit are no longer at the non-information level, the operation is determined to be complete and the operation in the next computer unit can be initiated.

The feasibility of constructing a computer using the three-level system depends upon the additional cost of the circuitry which must operate upon three-level signals instead of two-level signals. Many inverter circuits and latch circuits are employed in computers. Therefore, these and other circuits must be constructed using a minimum number of components without sacrificing speed and accuracy.

It is an object of the present invention to provide a new inverter circuit capable of inverting three-level signals.

Another object of the present invention is to provide a new latch circuit capable of storing three-level signals.

A further object of the present invention is to provide new inverter and latch circuits which are economically constructed.

An additional problem in computers, whether using the two-level system or the three-level system, is that the signals during transmission become weak or distorted. A weak signal can cause errors within the computer and considerable attention is given by industry to develop circuits which can accept weak or distorted signals and provide outputs which are sharp and well defined. This problem becomes more acute when a three-level system of signals is used, since each circuit must distinguish between three different signal levels and not merely two levels.

Accordingly, it is an additional object of the present invention to provide inverter and latch circuits capable of accepting three-level signals having loose tolerances and providing sharp well-defined output signals having close tolerances.

These and other objects are accomplished in accordance with the broad aspect of the present invention by providing three potential sources, each source corresponding to one of the three signal levels. A switch couples one of the sources to an output terminal. Another switch couples a second source to the output terminal. The third source is coupled to the output terminal by a circuit which is effective only when the switches are non-operative. A control circuit accepts the three-level signal and controls the operation of the switches to achieve the desired logical operation. For example, the three-level inverter function can be formed by designing the control circuit to operate the switch coupling the source corresponding to the first level when the input is at the third level. The switch coupling the source corresponding to the second level is operated when the input is at the second level. Finally, when the input is at the first level neither of the switches is operated permitting the third source to be coupled to the output.

To form the latch function, a feedback circuit is added so that, when the input signal returns to the non-information level from either of the information levels, the output signal is maintained in the information level.

In accordance with a more limited aspect of the present invention, one of the signal switches includes a transistor having its emitter connected to a potential source corresponding to the first information level and the other signal switch includes a transistor having its emitter connected to a second potential source corresponding to the non-information level. A third potential source corresponding to the second information level is connected to the collectors of the transistors. When either of these transistors conducts, the output signal taken at the collector of the transistors is essentially connected directly to the potential source connected to the emitter. When neither of the transistors conducts, the third source is effectively coupled to the output. Therefore, a rather loose tolerance input signal can control the conduction in the two transistors, and an output signal defined sharply by one of the potential sources is provided.

The foregoing and other objects, features and advantages of the invention will be apparent from the following more particular description of preferred embodiments of the invention, as illustrated in the accompanying drawings.

Figure 3:
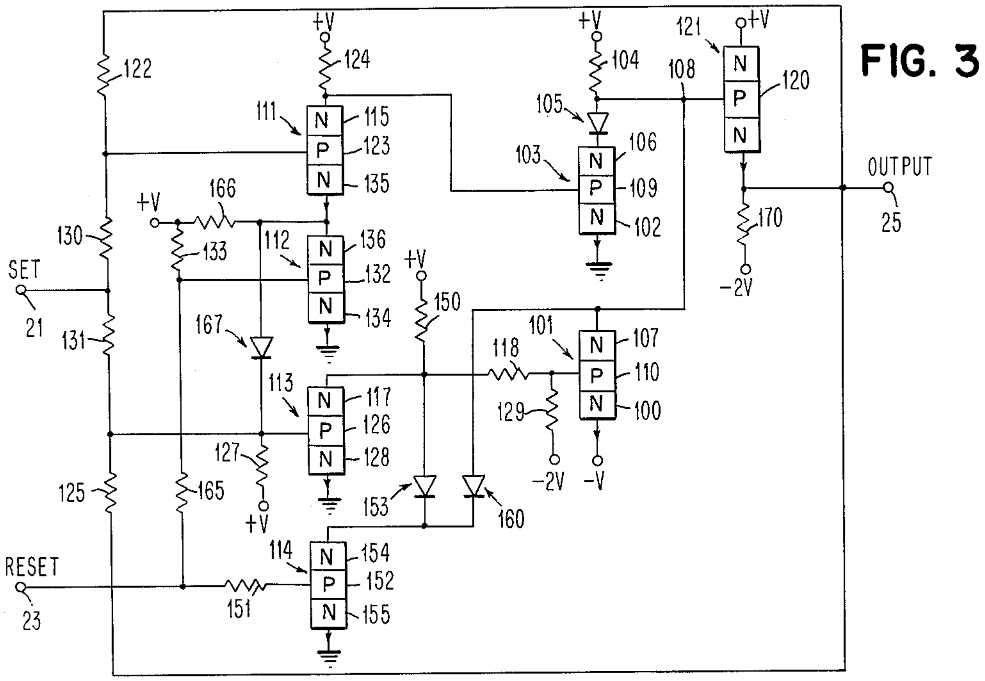
FIG. 3 is a circuit diagram of a three-level latch circuit showing another embodiment of the present invention.
Figure 3A:
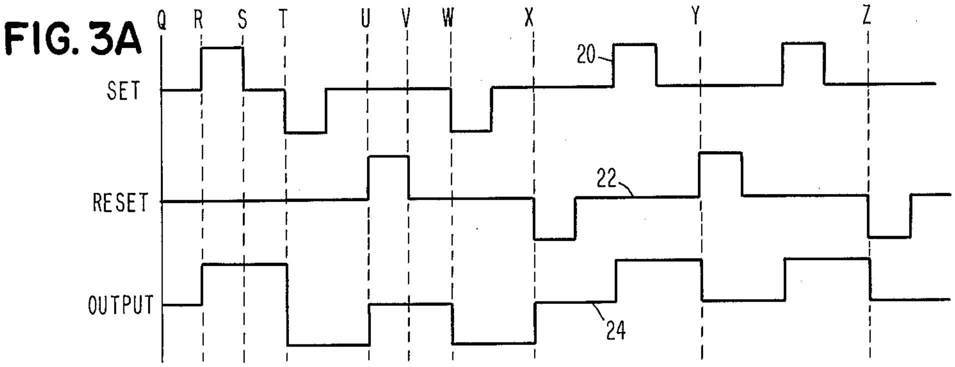

FIG. 3A a wave form diagram representing the operation of the circuit of FIG. 3.

The general operation of the circuit of FIG. 1 can be described with reference to the wave forms in FIG. 1A. Wave form 5 is applied to the input terminal 6 and the wave form 7 is generated at the output terminal 8. One of the functions of the three-level inverter is to provide a non-information output level when the input resides in the non-information level. This condition is represented at time A in FIG. 1A. At time B, the input shifts to the high information level. A low information level signal, which is the inversion of the high information level, is provided at the output. At C, the input returns to the non-information level and the output also returns to this level. When the input shifts to the low information level represented at time D, the inversion of the low information level is provided at the output. At E, both the input and output return to the non-information level. The particular operation of the transistors and other components in this circuit will be described hereinafter.

Figure 2:
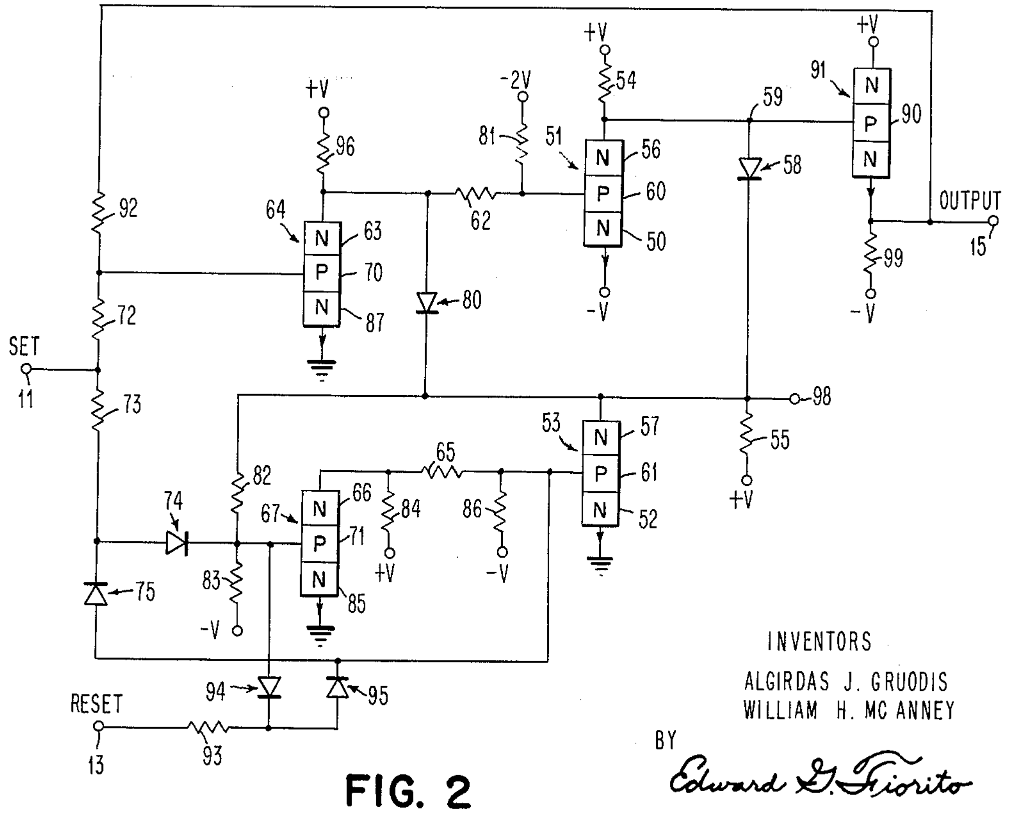
FIG. 2 is a circuit diagram of a three-level latch embodying the present invention.
Figure 2A:
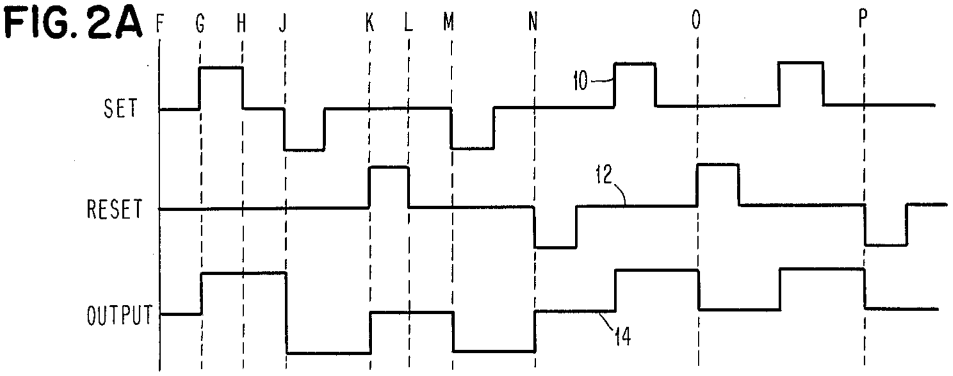
FIG. 2A is a wave form diagram representing the operation of the circuit of FIG. 2.

FIG. 2A represents the overall operation of the latch circuit in FIG. 2. The wave form 10 is applied to the set terminal 11; wave form 12 is applied to the reset terminal 13, and output 14 is generated at the output terminal 15. When the latch is set in the non-information state, as represented at time F, the output resides in the non-information level. The latch can be placed into the high information state by applying a high information level signal to the set terminal 11, as represented at time G. Even though the set signal returns at H to the non-information level, the output remains latched in the high information level. The latch is placed in the low information state at J by applying a low information level signal to the set terminal 11.

Application of either a high information level or a low information level signal to the reset terminal 13 places the latch in the non-information state regardless of whether the latch was previously in the high or the low information state. Four resetting conditions of the latch are represented by the wave forms at times K–P. At K, a high level reset signal resets the latch which was previously in the low state. Although at L the reset signal returns to the non-information level, the latch remains reset in the non-information state. At N, a low level reset signal resets the latch which was previously in the low state. At O, a high reset signal resets the latch which was previously in the high state. Finally, at P, a low reset signal resets the latch which was previously in the high state.

The overall operation of the latch circuit of FIG. 3 is identical with that of the latch circuit of FIG. 2. The wave forms 20, 22 and 24 of FIG. 3A are applied to the set terminal 21, reset terminal 23 and output terminal 25, respectively, of FIG. 3. The wave forms of FIGS. 3A and 2A are identical since their overall operation is identical. The differences in the circuit operation between the latch circuits of FIGS. 2 and 3 will be apparent from the following detailed description of these circuits.

DETAILED DESCRIPTION, INVERTER, FIG. 1

Figure 1:
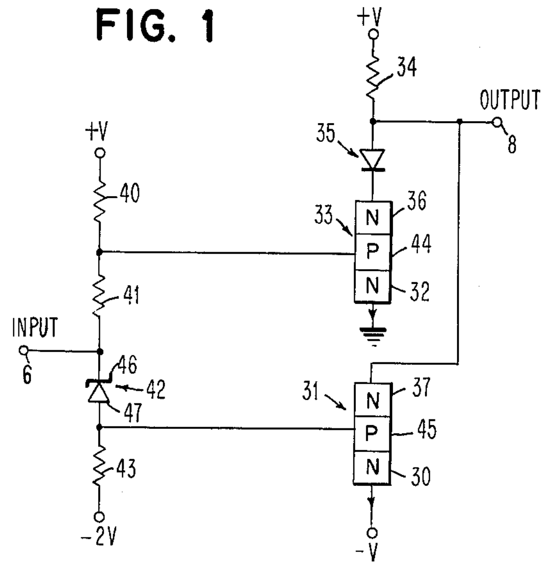
FIG. 1 is a circuit diagram of a three-level inverter embodying the present invention.
Figure 1A:
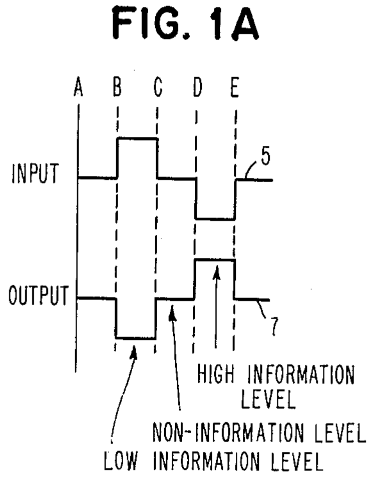
FIG. 1A is a wave form diagram representing the operation of the circuit of FIG. 1.

There are three sources of potential employed in the inverter circuit of FIG. 1. The first, labeled —V, is connected to the emitter of transistor 31. The second is a source of zero potential connected to the emitter 32 of transistor 33. The third potential source labeled +V is connected to the resistor 34. The —V source corresponds to the low information level; the zero source corresponds to the non-information level, and the +V source corresponds to the high information level. The diode 35 is connected between resistor 34 and collector 36 of transistor 33. The resistor 34 is connected to the collector 37 of transistor 31. The output terminal 8 is connected to the collector 37 and to the collector 36 through diode 35. When both transistors 31 and 33 are not conducting, the signal level on output terminal 8 approaches the +V source since only a small amount of current flows through the resistor 34. When transistor 33 conducts and transistor 31 does not conduct, the output is connected essentially to the zero source at the emitter 32. When transistor 31 conducts, the output is connected essentially the —V source connected to the emitter 30.

The network including components 40–43 controls the conduction in transistors 31 and 33 so that the three-level inversion of the input signal is provided at the output terminal 8. The resistor 41 is connected between the input terminal 6 and base 44 of transistor 33. Resistor 40 is connected between the base 44 and a source of positive potential labeled +V which, for this embodiment, has the same voltage value as the +V source connected to resistor 34. Resistors 40 and 41 form a divider network. Their values may be adjusted so that, when the input signal on terminal 6 is at the zero potential, transistor 33 is biased for conduction.

Zener diode 42 is connected between the input terminal 6 and the base 45. Resistor 43 is connected between the base 45 and a source of negative potential labeled —2V which is, for this embodiment, twice the negative valve of voltage of the —V source connected to the emitter 30. The zener diode 42 has a breakdown voltage from the cathode 46 to the anode 47. The breakdown voltage is chosen so that, when the input signal on terminal 6 is at the zero potential, a sufficient drop occurs across the zener diode 42 so that the transistor 31 is in a non-conductive condition. Therefore, when the input signal is at the zero potential, as represented at time A in FIG. 1A, transistor 31 is non-conductive while transistor 33 is conductive. The output signal on terminal 8 is essentially at the zero potential.

The breakdown voltage of the zener diode 42 is chosen so that, for input signals above a predetermined positive level, the transistor 31 is biased for conduction. Therefore, at time B, shown in FIG. 1A, transistor 31 conducts and the output signal level approaches the level of the —V source connected to emitter 30. The positive signal at time B is also applied to the base of transistor 33 tending to forward bias the junction between collector 36 and base 44. At this time the diode 35 becomes back biased thereby isolating the negative signal at output 8 from the positive signal at the base 44.

The divider 40, 41 is designed so that transistor 33 is non-conductive when the input signal on terminal 6 drops below a predetermined negative potential. Since the breakdown voltage of the zener diode 42 was chosen so that the transistor 31 was non-conductive when the input is at the zero potential level, when the input drops to a negative potential level, the transistor 31 is driven even further into the non-conductive region. Therefore, as shown at time D in FIG. 1A, when a negative signal is applied to the input terminal 6, transistors 31 and 33 are both non-conductive and the output signal level approaches the positive level of the +V source connected to resistor 34.

The divider network 40, 41 and transistor 33 must be capable of distinguishing between signals residing at the zero potential and signals at some negative potential, but need not be capable of distinguishing between signals at the zero potential and signals at positive potentials. The divider 40 and 41 can readily be designed so that weak or distorted signals which do not have a large negative excursion from the zero potential are sufficient to place transistor 33 in a non-conductive condition, while signals residing loosely about the zero potential are sufficient to cause conduction in transistor 33. Therefore, although the input signal may be weak or distorted, the output signal on terminal 8 will have a sharp clearly defined lever of either the +V potential or zero potential.

The network including zener diode 42 and resistor 43 and transistor 31 must be capable of distinguishing between input signals at the zero potential and signals above the zero potential, but need not be capable of distinguishing between signals below the zero potential and signals at the zero potential. This network can be readily designed so that signals which do not have a large positive excursion above the zero potential are sufficient to cause conduction in transistor 31, while signals which have a loose tolerance about the zero potential are insufficient to cause conduction in transistor 31. Therefore, weak or distorted input signals are capable of accurately causing conduction or non-conduction in transistor 31 so that a sharp well-defined output is provided on terminal 8, which approaches either the —V source or the +V source.

The zener diode 42 which is, in effect, a non-linear resistor, can be replaced by a linear resistor. The effect of this is to decrease the control over the transistor 31. Since a resistor would provide no sharp well-defined breakdown voltage as the input signal increased from the zero potential to a signal level sufficient to cause conduction in transistor 31, the transition between conduction and non-conduction in the transistor would occur over a broader range of input potential values. Where the tolerances on the input signal are sufficiently small the zener diode 42 can be replaced with a resistor, thereby making the circuit more economical.

Whether or not the zener diode is employed, only two active elements, transistors 31 and 33, are required to perform the three-level inverter function making this circuit economical. Also, the circuit is reliable since the control network 40–43 can be made to perform accurately. Finally, the outputs are sharp and well-defined since they are set by three stable potential sources.

DETAILED DESCRIPTION, LATCH, FIG. 2

Portions of the latch of FIG. 2 are similar to the inverter circuit of FIG. 1, particularly the manner in which the output signal is generated. Three potential sources define the signal at output terminal 15 in FIG. 2. The first, labeled −V, is connected to the emitter 50 of transistor 51. The second, zero potential, is connected to the emitter 52 of transistor 53. The third, labeled +V, is connected to the resistor 54 and resistor 55. Resistor 54 is connected to the collector 56 of transistor 51, and resistor 55 is connected to the collector 57 of transistor 53. The diode 58 is connected between the collectors 56 and 57. A three-level signal is generated at the node 59. When both transistors 51 and 53 are not conducting, the signal at 59 approaches the +V potential source connected to resistors 54 and 55. When transistor 53 conducts and transistor 51 does not conduct, the voltage at 59 approaches the zero potential source connected to emitter 52. When transistor 51 conducts, the signal level at node 59 approaches the −V potential source.

Transistors 51 and 53 are controlled by the circuitry connected to their bases 60 and 61, respectively. The base 60 is coupled by resistor 62 to the collector 63 of transistor 64. The base 61 is coupled by resistor 65 to the collector 66 of transistor 67. The bases 70 and 71 of transistors 64 and 67, respectively, are controlled by the signals applied thereto. The set signal on terminal 11 is coupled to the base 70 through resistor 72, and to the base 71 through resistor 73 and diode 74. The set signal is also coupled to the base 61 of transistor 53 through resistor 73 and diode 75.

The collector 57 of transistor 53 is connected through diode 80 to resistor 62. Resistor 81 is connected between the base 60 and a −2V potential source which has a negative potential value of twice the value of the source connected to the emitter 50. When transistor 53 conducts, transistor 51 is biased for non-conduction by the current drain through resistor 96 and diode 80.

Resistor 82 is connected between the base 71 and collector 57. The base 71 is coupled by resistor 83 to the same −V potential source that is connected to the emitter 50. Resistor 84 is connected between the collector 66 and the same +V potential source connected to resistors 54 and 55. When transistor 53 conducts, transistor 67 is placed in a non-conductive condition by decreasing the current drawn through resistors 82 and 83. When transistor 67 is not conducting, current flows through the resistors 84 and 65 into the base 61, thereby maintaining transistor 53 in a stable state of conduction.

When transistor 53 is conducting, the output at node 59 is at the zero potential level which is called the non-information level. When this output level appears, the latch is said to be in the non-information stable state. The latch may be switched to either a high information stable state or a low information stable state by applying a positive or a negative potential to the set terminal 11. A positive shift in the set signal on terminal 11 above the zero potential level is coupled through resistor 73 and diode 74 to the base 71 causing transistor 67 to conduct. When transistor 67 conducts, current flows through resistor 84 to the zero potential connected to the emitter 85. The −V potential source connected to emitter 50 is also coupled to the base 61 through resistor 86. When transistor 67 conducts, current through resistor 86 toward the −V source decreases thereby reducing the voltage at base 61 and stopping conduction in transistor 53. Diode 80 becomes reverse biased and isolates base 60 from transistor 53. Current from resistor 55 is fed back through resistor 82 maintaining conduction in transistor 67.

The positive set signal is also coupled through resistor 72 to the base 70, causing transistor 64 to conduct. Transistor 51 is placed in a non-conductive condition since its base 60 is essentially connected through resistor 62 to the zero potential source connected to the emitter 87 of transistor 64. At this time, the signal at node 59 approaches the potential of the +V source connected to resistors 54 and 55. This signal is transmitted to the base 90 of transistors 91, which is connected in an emitter follower configuration. Current gain is provided at the output terminal 15, but the voltage at node 59 and terminal 15 is the same. The signal at output terminal 15 is fed back through resistor 92 to the base 70 of transistor 64 so that transistor 64 is maintained in a conductive condition. Therefore, the positive signal on set terminal 11 can return to the zero potential level without causing transistor 64 to stop conduction. This condition of the latch is called the high stable state.

The operation of the latch in FIG. 2 described thus far is represented by the wave forms at times F–H in FIG. 2A. At time F, the latch is in the non-information state. When the set input signal at time G shifts from the zero potential level to some positive potential, transistors 51 and 53 are non-conductive and the output signal shifts from the zero potential to the high potential level. At H, the set signal returns to the zero potential but the output signal is maintained at the high information level by the feedback circuit including resistor 92.

The latch may be switched from the high stable state to the low stable state by applying a negative potential to the set terminal 11. The negative signal is coupled through resistor 72 to the base 70 of transistor 64, thereby stopping conduction in this transistor. When transistor 64 stops conduction, current flows from the +V potential source through the resistor 96 and through resistor 62 to the base 60 turning transistor 51 on. When transistor 51 turns on, the signal at node 59 approaches the −V potential source connected to emitter 50. This signal is applied to the transistor 91 and is fed back through resistor 92 to the base 70 thereby maintaining transistor 64 in a non-conductive condition. Therefore, the negative potential signal at terminal 11 can return to the zero potential level and transistor 64 remains in a non-conductive condition. When the signal at node 59 is negative diode 58 is reverse biased isolating transistor 53 from the output. The wave forms in FIG. 2A between times J and K represent the operation just described.

The latch can be reset from either the high information state or the low information state to the non-information state by either a positive or a negative potential signal applied to the reset terminal 13. The reset signal is coupled through resistor 93 and diode 94 to the base 71 of transistor 67. The reset signal is also coupled through resistor 93 and diode 95 to the base 61 of transistor 53. When a positive potential signal is applied to the reset terminal 13, current flows through resistor 93 and diode 95 into the base 61 of transistor 53 causing conduction in this transistor. When transistor 53 conducts, a zero potential signal is fed back through resistor 82, thereby placing transistor 67 in a non-conductive condition. Transistor 67 maintains transistor 53 in a conductive condition allowing the positive reset signal to return to the zero potential level without affecting the conduction of transistor 53. As shown in FIG. 2A at time K, the latch returns to the non-information state and remains in this state although the reset signal at time L returns to the zero potential.

At time M, with the latch in the non-information state, a negative set signal is applied to terminal 11. This negative signal draws current through resistor 73 and diode 75 away from the base 61, thereby placing transistor 53 in a non-conductive condition. The negative set signal also places transistor 64 in a non-conductive condition which in turn places transistor 51 in a conductive condition. The negative potential signal supplied at the collector 56 of transistor 51 is fed back through transistor 91 and resistor 92 maintaining the latch in the low information state.

At time N, a negative reset signal draws current through resistor 93 and diode 94 away from the base 71, thereby placing transistor 67 in a non-conductive condition. Nonconduction of transistor 67 causes transistor 53 to conduct, which in turn causes feedback through resistor 82 maintaining the transistor 67 in a non-conductive condition. Conduction of transistor 53 also draws current through diode 80 placing transistor 51 in a non-conductive condition. At time O, transistor 53 is placed in a conductive condition directly by a positive signal through diode 95 resetting the latch. At time P, the transistor 53 is placed in a conductive condition indirectly by stopping conduction in transistor 67 through diode 94.

From the above description, it is apparent that transistors 67 and 53 are connected in the form of a bistable circuit. The output signal at the collector 57 has two stable states either at the high information level or the non-information level. Transistors 64 and 51 form another bistable circuit which provides at the collector 56 a signal which is either at the high information level or the low information level. The diodes 80 and 58 cause the output signal from the collector 57 to override the output from the collector 56 when transistor 53 is conducting. As described in detail above, when transistor 51 is conducting and transistor 53 begins conducting, current through the diode 80 places the transistor 51 in a nonconductive condition. When transistor 51 is not conducting and transistor 53 begins conducting, the diode 58 drains the output signal down from the high information level to the non-information level.

The latch circuit of FIG. 2 has the same advantage as the inverter circuit of FIG. 1. A sharp well-defined output signal is generated since the level of the signal is determined by the potential sources connected to the emitters 50 and 52 and the resistors 54 and 55. The transistors 51 and 53 are controlled by signals, at the set and reset terminals 11 and 13, which may have loose tolerances. The set signal need only have a positive excursion from the zero potential sufficient to cause conduction in transistors 64 and 67. The negative excursion of the set signal need only be sufficient to stop conduction in transistors 64 and 53. Since the latch circuit has the feature of maintaining its high information state or its low information state, the set signal can return to a non-information level which has a loose tolerance about the zero potential level without affecting the proper operation of the circuit. The magnitude of the positive and negative set signals required for proper operation can be readily controlled by adjusting the value of the resistors 72, 73, 83, and 86.

The positive excursion of the reset signal need only the sufficient to cause conduction of transistor 53, while the negative excursion need only be sufficient to stop conduction in transistor 67. The required magnitude of these excursions can be determined by adjusting the value of the resistors 93, 83, and 86. Further adjustments can be made by altering the value of the potential sources connected to the resistors 83 and 86.

Besides the output at terminal 15 of FIG. 2, another useful output from the latch circuit is provided at terminal 98. The signal at terminal 98 indicates whether any information is stored in the latch. When transistor 53 is conducting, the signal at terminal 98 approaches the zero potential connected to the emitter 52, indicating that no information is stored in the latch. When the latch is in the high information state, the signal at terminal 98 approaches the +V potential source connected to resistors 54 and 55. When the latch is in the low information state, the signal on terminal 98 still resides near the +V potential connected to the resistor 55 since the diode 58 isolates the terminal 98 from the —V potential source connected to emitter 50 when transistor 51 is conducting. Therefore, the signal on terminal 98 is near the +V potential when the latch is set in either the high or low information state and the signal on terminal 98 is near zero potential when no information is stored in the latch.

DETAILED DESCRIPTION, LATCH FIG. 3

In the latch circuit of FIG. 3, the three-level output signal is determined by three potential sources. The first, —V, is connected to the emitter 100 of transistor 101; the second, a zero potential source, is connected to the emitter 102 of transistor 103. The third potential source, +V, is connected to resistor 104. Resistor 104 is connected through diode 105 to collector 106 and also connected directly to collector 107. The signal generated at node 108 resembles the signal at output terminal 8 in FIG. 1, and node 59 in FIG. 2. The operation of transistor 101 resembles the operation of transistors 51 and 31, while the operation of transistor 103 resembles the operation of transistors 53 and 33 of FIGS. 2 and 1. A difference between the latch of FIG. 3 and FIG. 2 appears in the control network connected to the bases 109 and 110. Four transistors 111, 112, 113, and 114 are employed in the control circuit of the latch in FIG. 3. The base 109 is connected to the collector 115. The base 110 is connected to the collector 117 through resistor 118.

When transistor 103 conducts, the signal at node 108 approaches the level of the zero potential source connected to emitter 102. This signal is connected to the base 120 of transistor 121 which is connected in an emitter-follower configuration. The output of transistor 121 is fed back through resistor 122 to the base 123, thereby placing transistor 111 in a non-conductive condition. Resistor 124 is connected between the collector 115 and the same +V potential source connected to resistor 104. When transistor 111 stops conducting, current flows through resistor 124 and 116 maintaining transistor 103 in a conductive condition. The zero potential output signal at terminal 25 is also fed back through resistor 125 to the base 126 of transistor 113. The transistor 113 is not placed in a non-conductive condition, as was transistor 111 by the zero potential output signal. The same +V source connected to resistor 104 biases transistor 113 through resistor 127 connected to base 126 so that transistor 113 conducts when the output is at the zero potential. When transistor 113 conducts, the signal at collector 117 approaches the level of the zero potential source connected to the emitter 128. Resistor 129 connected between the —2V potential source and base 110 draws current away from the base 110, thereby placing transistor 101 in a non-conductive condition. The —2V potential source for this illustrative embodiment is twice the value of the —V potential source connected to emitter 100.

When the output of the latch resides at the zero potential, the latch is said to be in the non-information level represented in FIG. 3A at time Q. The latch may be placed in the high information state or the low information state by a positive or negative signal on the set terminal 21. The terminal 21 is connected to the base 123 by resistor 130 and also to the base 126 by resistor 131. At time R, when the signal on set terminal 21 shifts from the zero to some positive potential, transistor 111 begins conducting. Transistor 112 conducts at this time because it is biased for conduction by the resistor 133 which is connected between the base 132 and the same +V potential source connected to resistor 104. The emitter 134 is connected to a source of zero potential and the emitter 135 is connected to the collector 136. Therefore, when transistors 111 and 112 conduct, the signal at the collector 115 approaches the zero potential source connected to the emitter 134. At this time, the base 109 is biased for non-conduction. The signal at node 108 approaches the +V potential source connected to resistor 104. This signal is fed back through transistor 121 and resistor 122, thereby maintaining transistor 111 in a conductive condition. The positive set signal on terminal 21 may now return to the zero potential as shown in FIG. 3A at time S without affecting the conductive condition of transistor 111.

The latch of FIG. 3 may be switched from the high information state to the low information state by applying a negative signal to the terminal 21. At time T, the set signal shifts from the zero potential to some negative potential, placing transistor 113 in a non-conductive condition. The resistor 150 is connected between the collector 117 and the same +V potential source connected to resistor 104. Current flows through resistors 150 and 118 to the base 110 placing the transistor 101 in a conductive condition. The signal at node 108 approaches the level of the —V potential source connected to emitter 100. This negative signal is fed back through transistor 121 and resistor 125 to the base 126, maintaining transistor 113 in a non-conductive condition. Therefore, the set signal can return to the zero potential without affecting the operation of transistor 113. At this time the diode 105 is reverse biased isolating the node 108 from transistor 103.

The latch can be reset from the low information state to the non-information state by applying a positive signal to the reset terminal 23. At time U, the reset signal shifts from the zero potential to some positive potential. This signal is coupled through resistor 151 to base 152 of transistor 114, placing it in a conductive condition. Transistor 101 is placed in a non-conductive condition by current drawn through diode 153 connected between collectors 154 and 117. The current is drawn down to the zero potential source connected to emitter 155. The collector 154 is connected through diode 160 to node 108. Therefore, when transistor 114 conducts, the signal at node 108 approaches the level of the zero potential source connected to emitter 155. The zero potential signal at node 108 is fed back through transistor 121 and resistor 125 to the base 126, placing transistor 113 in a conductive condition. Conduction of transistor 113 maintains transistor 101 in a non-conductive condition. When the reset signal returns to the zero potential at time V, transistor 114 is placed in a non-conductive condition. Since transistor 103 is conducting at this time, the output level remains at the zero potential connected to the emitter 102.

At time W, a negative set signal is placed on the terminal 21, causing transistor 113 to stop conduction and transistor 101 to begin conduction. The latch thus placed in the low information state can be reset to the non-information state by applying a negative reset signal to the terminal 23. At time X, the signal on terminal 23 shifts from the zero potential to some negative potential. This signal is coupled through resistor 165 to the base 132 of transistor 112, thereby stopping conduction in transistor 112. The resistor 166 connected between the +V source and collector 136 supplies current through diode 167 to the base 126, thereby placing transistor 113 in a conductive condition. Conduction of transistor 113 stops conduction in transistor 101. The signal at node 108 approaches the level of the zero potential source connected to the emitter 102.

At time Y, a positive shift in the reset signal causes transistor 114 to conduct, drawing the signal at node 108 down to the zero potential. This signal is fed back through transistor 121 and resistor 122 to the base of 123, thereby stopping conduction in transistor 111, which, in turn, places transistor 103 in a conductive condition.

At time Z, a negative shift in the reset signal on terminal 23 causes transistor 112 to stop conducting and transistor 111 in turn to stop conducting. When transistor 111 stops conducting, transistor 103 begins conducting and the signal at node 108 drops to the level of the zero potential source connected to emitter 102. The zero potential signal is fed back through transistor 121 and resistor 122 to maintain transistor 111 non-conductive. The negative reset signal can return to the zero potential causing transistor 112 to conduct without affecting the output.

The tolerances placed upon the set and reset signals need not be severe. The positive set signal need only be sufficient to cause conduction in transistors 111 and 113. The negative set signal need only be sufficient to stop conduction in transistor 113, since conduction in transistor 111 can be stopped by the negative output signal fed back through resistor 122. The zero potential level of the set signal is not critical since the latch circuit does not change its state in response to a shift from the high or low levels to the zero potential level. The positive reset signal need only be sufficient to cause conduction in transistor 114, while the negative reset signal need only be sufficient to stop conduction in transistor 112. Therefore, the set and reset signals can be weak or suffer distortion due to transmission through prior units of the computer without causing inaccurate control of the transistors 101 and 103. The output signal generated by the latch circuit of FIG. 3 has close tolerances since it is determined by the potential sources connected to the emitters 100 and 102 and resistor 104.

The following is a table of values of resistances, potential sources, zener diode breakdown voltage, and transistor specifications. These values are set forth by way of example only and the invention is not limited to them, nor any of them.

*Table*

INVERTER, FIG. 1

| | |
|---|---|
| +V potential source ____________volts D.C.__ | +12 |
| —V potential source ____________volts D.C.__ | 6 |
| Zero potential source ______________________ | ground. |
| Resistor **34** ____________________kilohms__ | 2.2 |
| Resistor **40** _______________________do____ | 8.2 |
| Resistor **41** _______________________do____ | 1.8 |
| Resistor **43** _______________________do____ | 1.5 |
| Zener diode breakdown voltage _______volts__ | 6.8 |

LATCH, FIG. 2

| | |
|---|---|
| +V potential source ____________volts D.C.__ | +12 |
| —V potential source ____________volts D.C.__ | —6 |
| Zero potential source ______________________ | ground. |
| Resistor **54** ____________________kilohms__ | 4.7 |
| Resistor **55** _______________________do____ | 2.0 |
| Resistor **99** _______________________do____ | 1.0 |
| Resistor **81** _______________________do____ | 3.6 |
| Resistor **62** _______________________do____ | 5.1 |
| Resistor **65** _______________________do____ | 1.5 |
| Resistor **86** _______________________do____ | 10.0 |
| Resistor **96** _______________________do____ | 0.91 |
| Resistor **84** _______________________do____ | 4.3 |
| Resistor **82** _______________________do____ | 3.0 |
| Resistor **83** _______________________do____ | 4.7 |
| Resistor **93** _______________________do____ | 1.0 |
| Resistor **73** _______________________do____ | 0.62 |
| Resistor **72** _______________________do____ | 2.0 |
| Resistor **92** _______________________do____ | 5.6 |

LATCH, FIG. 3

| | | |
|---|---|---|
| +V potential source | volts D.C. | +6.0 |
| —V potential source | volts D.C. | —6.0 |
| Zero potential source | | ground. |
| Resistor **104** | kilohms | 1.0 |
| Resistor **170** | do | 0.56 |
| Resistor **129** | do | 3.6 |
| Resistor **118** | do | 3.9 |
| Resistor **124** | do | 1.0 |
| Resistor **166** | do | 1.1 |
| Resistor **150** | do | 0.82 |
| Resistor **133** | do | 5.7 |
| Resistor **127** | do | 3.8 |
| Resistor **165** | do | 2.2 |
| Resistor **151** | do | 2.0 |
| Resistor **122** | do | 4.17 |
| Resistor **130** | do | 2.78 |
| Resistor **131** | do | 0.825 |
| Resistor **125** | do | 2.89 |

Transistors—junction type, NPN, $B=20$

In the inverter circuit of FIG. 1 the diode 35 was placed between the collectors 36 and 37 to isolate a negative output signal from a positive signal at the base 44. In some circuit applications, where the —V source connected to the emitter 30 is small, the diode 35 can be removed from the circuit. Although the collector base junction of transistor 33 would then become forward biased, the junction can sustain a small voltage across it before causing the output to become positive. Also, as described before the zener diode 42 can be replaced with a resistor if the tolerances on the input signal are sufficiently good. Further, the value of the potential source connected to the resistor 40 is shown to be the same as the value of the potential source connected to the resistor 34. This is convenient in most circuit applications, but it need not be so. The value of the potential source connected to resistor 40 can be adjusted in order to perform the control function of the divider network 40 and 41 described in detail above. It is also true that the —2V potential source connected to the resistor 43 can be varied to obtain proper operation of the circuit and need not be precisely twice the value of the potential source connected to the emitter 30. The potential sources in the latch circuits of FIGS. 2 and 3 can also be varied. For example, in FIG. 2 the —V potential source connected to resistors 83 and 86 need not be the same value as the potential source connected to the emitter 50.

In the latch circuits of FIGS. 2 and 3 a positive set signal results in a corresponding positive output signal, while a negative set signal results in a corresponding negative output signal. The control network for each latch could be altered so that a positive set signal could result in a corresponding negative output signal, while a negative set signal could result in a corresponding positive output signal. This alteration could be achieved very simply, for example, by applying the set signal to the input terminal 6 of the inverter of FIG. 1 and connecting the output terminal 8 to set terminal 11 or 21 of the latch circuits of FIGS. 2 and 3. Therefore, the potential level of the set signal does not have to be identical to the potential level of the output signal. In fact, this is not likely to be true even in the circuits of FIGS. 1–3 as disclosed, since the input signals may be weak and may not have a large excursion from the zero potential level, while the output signal has a gerater excursion from the zero potential level. Although the potential levels of the input and output signals may not be identical, there is a correspondence between them so that for any given output signal the level of the input signal is known.

The transistors 33 and 31 in FIG. 1, and transistors 51 and 53 in FIG. 2, and transistors 103 and 101 in FIG. 3 are all connected in an inverter configuration. Their collectors are connected to the same potential source through a resistor and their emitters are connected directly to two different potential sources. The output is taken from their collectors to form a three-level signal. The three-level signal can also be generated by transistors connected in an emitter follower configuration. Here the collectors would be connected directly to two different potential sources and the emitters would be connected to the same potential source through a resistor. The output would be taken from the emitter.

Whether the switching elements are connected in the inverter configuration or the emitter follower configuration, the three level signal can be generated by two switches, one which switches from a first level to a third level and another which switches from a second level to some other level. In the illustrative embodiments of the present invention, two switches are used; one switching from a first level to a third level and the other switching from a second level to a third level. It is not necessary that both of the switches be capable of switching to the third level in order to generate the third level output signal. For example, transistor 53 could be made to switch from the zero potential level (or second level) to some potential higher than the +V (or third level) by increasing the value of the potential source connected to resistor 55. In some circuit applications this may decrease the turn-on time of transister 53 without affecting the overall operation of the circuit, since diode 58 isolates the output.

The signals at nodes 108 and 59 are shown applied to emitter follower transistors to supply current drive for the feedback loops. For some circuit applications the emitter follower can be eliminated.

In the inverter of FIG. 1, a single terminal 8 is shown connected to both the collectors 36 and 37. It is not necessary that the collectors be joined. For example, the collector 37 can be connected separately to the +V potential source through an additional resistor similar to the manner in which the collectors 56 and 57 of FIG. 2 are connected. Where the collectors 37 and 36 in the inverter of FIG. 1 are separated as described, two separate outputs are obtained. One output exists in either the high information level or the low information level and the other provides a signal at the non-information level when transistor 33 is conducting. For some computer operations, these two separate outputs may be useful.

The circuits of FIGS. 1–3 employ NPN type transistors. The circuits can be implemented using PNP type transistors. For this implementation all of the potential sources are reversed in polarity about the zero potential source. The operation of the circuit implemented with PNP type of transistor can be represented by reversing the positive and negative signals shown in FIGS. 1A–3A about the zero potential level.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for storing a set signal and a reset signal, each capable of existing at a first, a second, or a third signal level comprising: a bistable circuit including a first transistor having a base, an emitter, and a collector electrode; a second bistable circuit including a second transistor having a base, an emitter, and a collector electrode; a first, a second, and a third source of potential corresponding to said first, second, and third signal levels; circuit means connecting said third source to the collector electrodes of said first and second transistors, said second source to the emitter electrode of said second transistor and said first source to the emitter electrode of said first transistor; control means connected to said first bistable circuit for accepting said set signal and placing said first transistor in a stable state of conduction when said set signal is at said first level; control means connected to said second bistable circuit for accepting said reset signal and placing said second transistor in a stable state of conduction when said reset signal is at said first or third levels; circuit means connected to said first and second bistable circuits for causing said first transistor to be non-conductive when said second transistor is conducting.

2. Apparatus as claimed in claim 1, further characterized by the addition of a unilateral conducting means connected between the collector electrodes of said first and second transistors.

3. Apparatus for inverting an input signal capable of existing at a first, a second or a third signal level comprising: a first transistor and second transistor, each having a base, an emitter, and a collector electrode; a first, a second, and a third source of potential corresponding to said first, second, and third signal levels respectively; circuit means for connecting said third source to the collector electrodes of said first and second transistors, said first source to the emitter electrode of said first transistor, and said second source to the emitter electrode of said second transistor; and, control means connected to the base electrodes of said first and second transistors for accepting said input signal and for controlling conduction in said transistors so that first transistor conducts when said input signal is at said third level and said second transistor conducts when said input is at said second level, said control means including an input terminal for accepting said input signal, a resistor divider network connected between said input terminal and the base electrode of said second transistor, and a zener diode connected between said input terminal and the base electrode of said first transistor.

4. Apparatus for inverting an input signal capable of existing at a first, a second or a third signal level comprising: a first transistor and second transistor, each having a base, an emitter, and a collector electrode; a first, a second, and a third source of potential corresponding to said first, second, and third signal levels respectively; circuit means for connecting said third source to the collector electrodes of said first and second transistors, said first source to the emitter electrode of said first transistor, and said second source to the emitter electrode of said second transistor, said circuit means including a unilateral conducting means connected between said collector electrodes; and, control means connected to the base electrodes of said first and second transistors for accepting said input signal and for controlling conduction in said transistors so that said first transistor conducts when said input signal is at said third level and said second transistor conducts when said input is at said second level.

5. Apparatus for storing an input signal capable of existing at a first, a second, or a third signal level comprising: a first, a second, and a third source of potential corresponding to said first, second, and third signal levels respectively; a first signal switching means connected between said first source and an output terminal for coupling said first source to said output terminal when in an operative condition; a second signal switching means connected between said second source and said output terminal for coupling said second source to said output terminal when in an operative condition; control means connected to said first and second switching means for accepting said input signal and for operating said first switching means when said input signal is at said first level and for operating said second switching means when said input signal is at said second level; coupling means connected between said third source and said output terminal for effectively coupling said third source to said output terminal only when said first and second switching means are non-operative; and feedback means connected between said output terminal and said control means for maintaining the operative condition of said first switching means after said input signal has made an excursion from the second level.

6. Apparatus for storing a set signal and a reset signal, each capable of existing at a first, a second, or a third signal level comprising: a first, a second and a third source of potential corresponding to said first, second, and third signal levels respectively; a first signal switching means connected between said first source and an output terminal for coupling said first source to said output terminal when in an operative condition; a second signal switching means connected between said second source and said output terminal for coupling said second source to said output terminal when in an operative condition; control means connected to said first and second switching means for accepting said set and reset signals and for operating said first switching means when said set signal is at said first level and for operating said second switching means when said reset signal is at said first or third levels; coupling means connected between said third source and said output terminal for effectively coupling said third source to said output terminal only when said first and second switching means are non-operative; and feedback means connected between said output terminal and said control means for maintaining the operative condition of said first and second switching means after said set and reset signals have made an excursion from the second level.

7. Apparatus for storing a set signal and a reset signal, each capable of existing at a first, a second, or a third signal level comprising: a first transistor and a second transistor, each having a base, an emitter and a collector electrode; a first, a second, and a third source of potential corresponding to said first, second, and third signal levels respectively; circuit means connecting said third source to the collector electrodes of said first and second transistors, said second source to the emitter electrode of said second transistor, and said first source to the emitter electrode of said first transistor; control means connected to the base electrodes of said first and said second transistors for accepting said set and reset signals and for causing conduction in said first transistor when said set signal is at the first level and conduction in said second transistor when said reset signal is at said first or third levels; feedback means connected between the collector electrodes of said transistors and said control means for maintaining conduction in said first and second transistors after said set and reset signals have made an excursion from the second level.

8. Apparatus as claimed in claim 7 further characterized by the addition of a unilaterial conducting means connected between the collector electrodes of said first and second transistors.

9. Apparatus for storing an input signal capable of existing at a first, a second, or a third signal level comprising: a first bistable circuit having a first level stable state during which a signal is provided at its output terminal corresponding to said first signal level and a third level stable state during which a signal is provided at its output terminal corresponding to said third signal level; a second bistable circuit having a second level stable state during which a signal is provided at its output terminal corresponding to said second signal level; control means connected to said first and second bistable circuits for accepting said input signal and placing said first bistable circuit in its first state when said input signal is at said first level and in its third state when said input signal is at said third level and placing said second bistable circuit in its second state when said input signal is at said second level; circuit means connected to said first and second bistable circuits for causing the output of said first bistable circuit to override the output of said second bistable circuit after said input signal has made an excursion from the second level.

10. Apparatus for storing a set signal and a reset signal, each capable of existing at a first, a second, or a third signal level comprising: a first bistable circuit having a first level stable state during which a signal is provided at its output terminal corresponding to said first signal level and a third level stable state during which a signal is provided at its output terminal corresponding to said third signal level; a second bistable circuit having a second level stable state during which a signal is provided at its output terminal corresponding to said second signal level; control means connected to said first bistable circuit for accepting said set signal and placing said first bistable circuit in its first state when said set signal is at said first level and in its third state when said set signal is at said third level; control means connected to said second bistable circuit for accepting said reset signal and placing said second bistable circuit in its second state when said reset signal is at said first or third levels; circuit means connected to said first and second bistable circuits for causing the output of said second bistable circuit to override the output of said first bistable circuit when said second bistable circuit is in its second state.

References Cited by the Examiner

UNITED STATES PATENTS

| | | | |
|---|---|---|---|
| 3,027,464 | 3/62 | Kosonocky. | |
| 3,129,340 | 4/64 | Baskin | 307—88.5 |

OTHER REFERENCES

Trampel: I.B.M. Technical Disclosure Bulletin, vol. 4, No. 2, July 1961.

ARTHUR GAUSS, *Primary Examiner.*